US005378515A

United States Patent [19]

Hatton

[11] Patent Number: 5,378,515

[45] Date of Patent: Jan. 3, 1995

[54] CORNER TAB AND METHOD OF MAKING SAME

[75] Inventor: Richard J. Hatton, Wellington, Ohio

[73] Assignee: E L Hatton Sales, Co., Westlake, Ohio

[21] Appl. No.: 131,197

[22] Filed: Oct. 1, 1993

[51] Int. Cl.[6] .................. B32B 31/00

[52] U.S. Cl. .................. 428/40; 24/67 AR; 40/657; 40/665; 283/80; 283/81; 402/79; 402/80 R; 402/500; 428/41; 428/131; 428/137; 428/194; 428/317.1; 428/317.3; 428/317.7

[58] Field of Search .................. 428/40, 41, 131, 137, 428/192, 194, 220, 317.1, 317.3, 317.7, 354, 355, 356; 402/500, 79, 80 R; 283/80, 81; 40/657, 665; 24/67 AR

[56] References Cited

U.S. PATENT DOCUMENTS

| | | | |
|---|---|---|---|
| 3,677,250 | 7/1972 | Thomas | 24/67 AR |
| 4,718,962 | 1/1988 | Goodwin | 428/40 |
| 4,773,172 | 9/1988 | Fast | 40/657 |
| 4,865,352 | 12/1989 | Gollon | 283/81 |

OTHER PUBLICATIONS

"Introducing Banner Ups Adhesive Banner Corner Tabs," Product Literature Distributed by E. L. Hatton Sales, Co.

"Banner Grabbers," Product Literature Distributed by Advertising Ideas Company.

*Primary Examiner*—Nasser Ahmad

*Attorney, Agent, or Firm*—Renner, Otto, Boisselle & Sklar

[57] ABSTRACT

The invention is directed to a comer tab comprising: an elongated flexible strip; adhesive means overlying at least part of said flexible strip; and a protective release sheet overlying said adhesive means; said comer tab being characterized by straight lines and sharp comers and having a narrow middle neck portion and opposed wide end portions, said end portions being aligned along the center axis of said middle neck portion and being connected to said middle neck portion by tapered intermediate portions, each of said tapered intermediate portions having narrow ends adjacent said narrow middle neck portion and wide ends adjacent said wide end portions, the angles formed at the intersections of each of said intermediate portions with said narrow middle neck portion being about 135°, the angles formed at the intersections of each of said intermediate portions with said wide end portions being about 135°, the width of each of said end portions being about twice the width of said middle neck portion, the length of said middle neck portion being about equal to the combined lengths of said end portions; said adhesive means and said protective release sheet overlying each of said end portions, said intermediate tapered portions and at least part of said neck portion. The invention is also directed to a method of making the foregoing comer tab, comprising: providing a sheet of flexible material; applying an adhesive to at least one side of said sheet; overlying said adhesive with a protective release sheet to form a laminate structure; and cutting said laminate structure into a plurality of said comer tabs; prior to said cutting, said comer tabs being aligned end to end in a plurality of successive courses, one above the other, each successive course being off-center from the next adjacent successive course by one-half the length of a comer tab, during said cutting there being essentially no waste of said flexible sheet material, protective release sheet or adhesive between said successive courses.

4 Claims, 2 Drawing Sheets

CORNER TAB AND METHOD OF MAKING SAME

FIELD OF THE INVENTION

The present invention relates to comer tabs, and to a method of making such comer tabs. The comer tabs of the present invention are useful for hanging or suspending articles such as signs, banners, and the like.

Background of the Invention

It is common practice to hang or suspend articles such as signs, banners and the like using curved edge flexible comer tabs of the type depicted in FIGS. 1 and 2. Referring to FIGS. 1 and 2, the curved edge comer tabs 10 of the prior art are comprised of tapered end portions 12 and 14 connected by narrow neck portion 16. These comer tabs are typically made from thin sheets of flexible plastic material. The end portions 12 and 14 have adhesive laminates 18 and 20 overlying one side thereof. Adhesive laminate 18 has a first adhesive layer 21 overlying and adhered to end portion 12; a plastic foam layer 22 overlying and adhered to first adhesive layer 21; and a second adhesive layer 23 overlying and adhered to plastic foam layer 22. A protective release sheet 24 overlies and is adhered to second adhesive layer 23. Similarly, adhesive laminate 20 has a first adhesive layer 25 overlying and adhered to first adhesive layer 25; a plastic foam layer 26 overlying and adhered to first adhesive layer 25; and a second adhesive layer 27 overlying and adhered to plastic foam layer 26. A protective release sheet 28 overlies and is adhered to second adhesive layer 27. Alternatively, the adhesive laminates 18 and 20 can overlie both sides (i.e., the top and bottom) of the end portions 12 and 14. Centrally located holes 29 and 30 are located in end portions 12 and 14, respectively. Although these curved edge comer tabs are popular and commonly used, there are problems associated with their use and manufacture.

One problem associated with the use of curved edge comer tabs is the outward pressure on the neck portion of the comer tabs that inherently develops. See, for example, FIG. 5 wherein prior art comer tab 10 is used to hang sign 38 from rope 40. The outward pressure on the neck 16 causes the comer tab 10 to have limited adhesion to sign 38. Also, the use of stronger plastic material in a comer tab generally means less flexibility and more outward pressure on the neck portion. Not only is it desirable to use stronger plastics in similar comer tabs to increase strength, it is desirable to improve the adhesion of a comer tab to an article and to improve the durability once attached to an article.

The manufacture of these curved edge prior an comer tabs presents at least two significant problems. First, curved edge comer tabs must be manufactured using one of two die patterns of the type depicted in FIGS. 3 and 4. Both of these die patterns involve covering sections of a plastic sheet 40 with narrow slits 42 of adhesive tape so that only the end portions 12 and 14 of the comer tabs 10 have adhesive attached thereto. The adhesive tape when applied ultimately forms adhesive laminates 18 and/or 20 and protective release sheets 24 and/or 28. The method involves slitting adhesive tape to a precise width, alignment of that narrow slit tape to a precise position on the plastic sheet and inspection before, during and after the patterns are cut to insure that only the end portions 12 and/or 14 are covered with adhesive. This manufacturing method requires considerable time and expense. The second problem associated with the manufacture of the curved edge comer tabs of the prior art is the substantial waste of material 44 after the die patterns have been cut. (The cross-hatched material 44 in FIGS. 3 and 4 between the tab patterns 10 is wasted.) Therefore, it is desirable to increase the efficiency of this manufacturing method while eliminating excess waste.

SUMMARY OF THE INVENTION

The invention is directed to a comer tab comprising: an elongated flexible strip; adhesive means overlying at least part of said flexible strip; and a protective release sheet overlying said adhesive means; said corner tab being characterized by straight lines and sharp comers and having a narrow middle neck portion and opposed wide end portions, said end portions being aligned along the center axis of said middle neck portion and being connected to said middle neck portion by tapered intermediate portions, each of said tapered intermediate portions having narrow ends adjacent said narrow middle neck portion and wide ends adjacent said wide end portions, the angles formed at the intersections of each of said intermediate portions with said narrow middle neck portion being about 135°, the angles formed at the intersections of each of said intermediate portions with said wide end portions being about 135°, the width of each of said end portions being about twice the width of said middle neck portion, the length of said middle neck portion being about equal to the combined lengths of said end portions; said adhesive means and said protective release sheet overlying each of said end portions, said intermediate tapered portions and at least part of said neck portion. The invention is also directed to a method of making the foregoing comer tab, comprising: providing a sheet of flexible material; applying an adhesive to at least one side of .said sheet: overlying said adhesive with a protective release sheet to form a laminate structure: and cutting said laminate structure into a plurality of said comer tabs; prior to said cutting, said comer tabs being aligned end to end in a plurality of successive courses, one above the other, each successive course being off-center from the next adjacent successive course by one-half the length of a comer tab, during said cutting there being essentially no waste of said flexible sheet material, protective release sheet or adhesive between said successive courses.

BRIEF DESCRIPTION OF THE DRAWINGS

In the annexed drawings, like parts and features have like references.

DETAILED DESCRIPTION OF THE PREFERRED EMBODIMENTS

Figure 6:
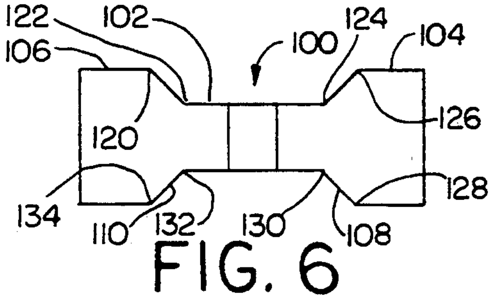
FIG. 6 is a topical view showing a comer tab of the present invention in a particular form.
Figure 8:
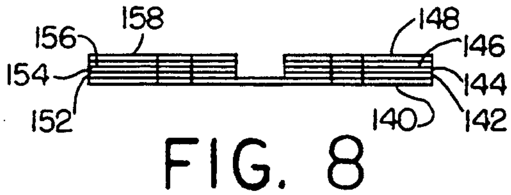
FIG. 8 is a side elevational view of the comer tab depicted in FIG. 6.

Referring initially to FIGS. 6 and 8, the inventive comer tab 100 is characterized by straight lines and sharp comers. Comer tab 100 has a narrow middle neck portion 102 and opposed wide end portions 104 and 106. The wide end portions 104 and 106 are aligned along the center axis of the middle neck portion 102. The end portions 104 and 106 are connected to the middle neck portion 102 by tapered intermediate portions 108 and 110, respectively. Tapered portion 108 has a narrow end adjacent to and connected to neck portion 102 and a wide end adjacent to and connected to wide end portion 104. Similarly, tapered intermediate portion 110 has a narrow end adjacent to and connected to neck portion 102 and a wide end adjacent to and connected to end portion 106. The angles at comers 120, 122, 124. 126, 128, 130, 132 and 134 are each about 135°. The width of each of the end portions 104 and 106 are each equal to about twice the width of the middle neck portion 102. The length of the middle neck portion 102 is about equal to the combined lengths of the end portions 104 and 106.

Corner tab 100 is comprised of elongated flexible strip 140 which is of unitary construction and forms neck portion 102, intermediate portions 108 and 110, and end portions 104 and 106. Adhesive layer 142 overlies and is adhered to one side of end portion 104, intermediate portion 108 and part of neck portion 102. Plastic foam layer 144 overlies and is adhered to adhesive layer 142. Adhesive layer 146 overlies and is adhered to plastic foam layer 144. Protective release sheet 148 overlies and is adhered to adhesive layer 146. Similarly, adhesive layer 152 overlies and is adhered to one side of end portion 106, intermediate portion 110 and part of neck portion 102. Plastic foam layer 154 overlies and is adhered to adhesive layer 152. Adhesive layer 156 overlies and is adhered to plastic foam layer 154. Protective release sheet 158 overlies and is adhered to adhesive layer 156.

Figure 6A:
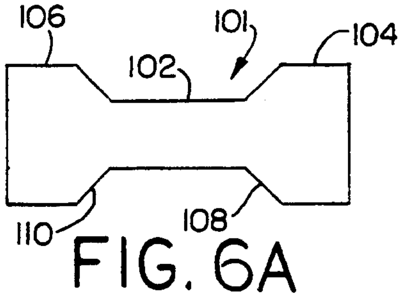
FIG. 6A is a topical view showing a comer tab of the present invention in another particular form.
Figure 8A:
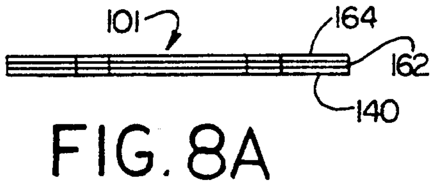
FIG. 8A is a side elevational view of the comer tab depicted in FIG. 6A.

In FIGS. 6A and 8A, an alternate embodiment of the inventive corner tab is depicted. This comer tab 101 has a middle neck portion 102, end portions 104 and 106, and intermediate portions 108 and 110 as described above with respect to the comer tab 100 illustrated in FIGS. 6 and 8. It also comprised of an elongated flexible strip 140, as described above. It is distinguishable, however, in that it includes a single adhesive layer 162 which extends over the entire length and width of flexible strip 140, and a single protective release sheet 164 which overlies and is adhered to adhesive layer 162.

Figure 1:
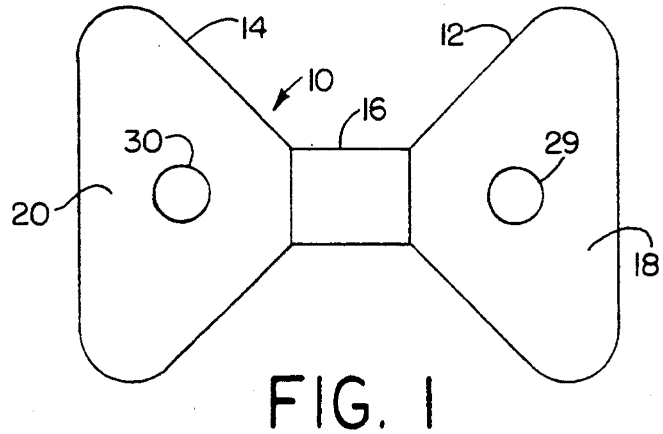
FIG. 1 is a topical view showing a curved edge flexible corner tab of the prior art.
Figure 7:
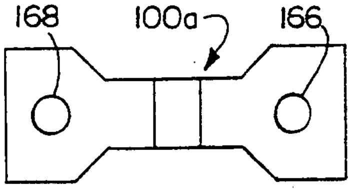
FIG. 7 is a topical view showing a comer tab of the present invention in another particular form.
Figure 5:
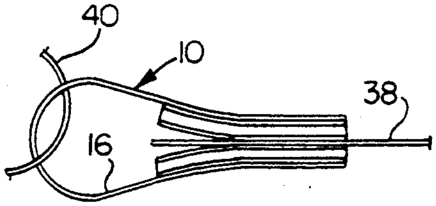
FIG. 5 is a side elevational view of the comer tab depicted in FIG. 1 suspending an article from a string or rope.
Figure 2:
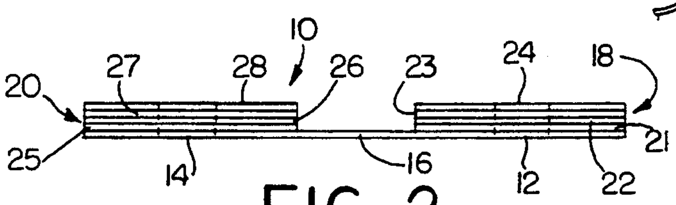
FIG. 2 is a side elevational view of the comer tab depicted in FIG. 1.
Figure 3:
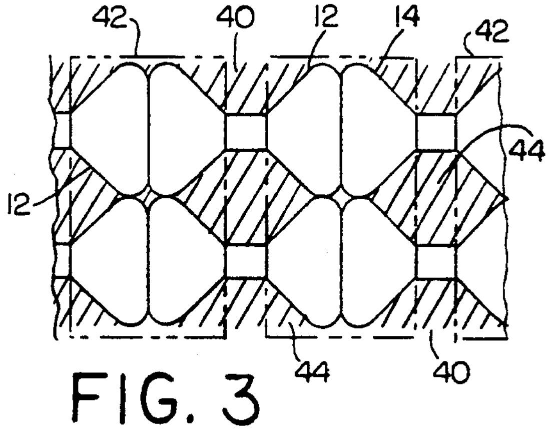
FIGS. 3 and 4 are topical views showing laminate structures with cutting patterns for making the curved edge comer tab depicted in FIG. 1 indicated thereon.
Figure 4:
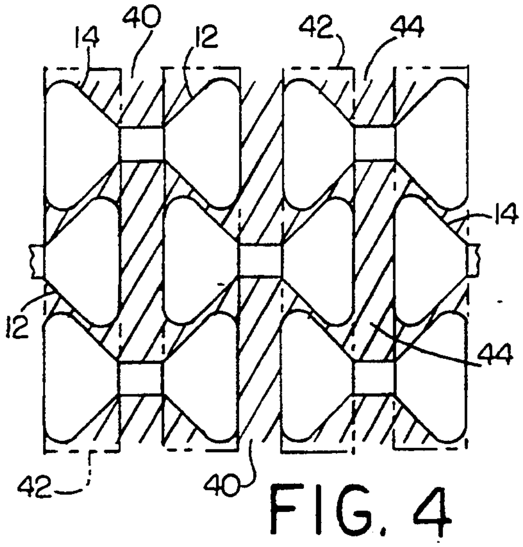

The comer tab 100*a* depicted in FIG. 7 is identical to the corner tab 100 depicted in FIG. 6 with the exception that the comer tab 100*a* includes centrally located holes 166 and 168 in the end portions thereof.

Figure 10:
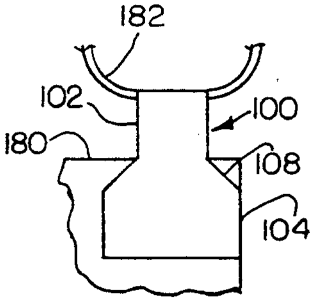
FIGS. 10-12 depict the comer tab of FIG. 6 used in suspending article from a string or rope.
Figure 11:
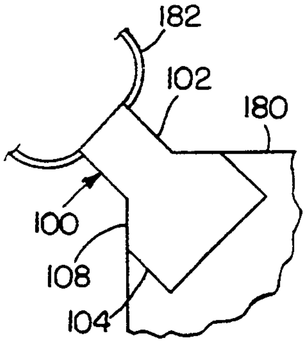
Figure 12:
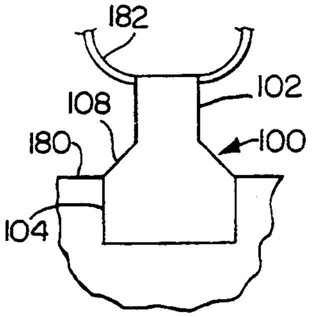

The elongated flexible strip 140 is of unitary construction and is preferably formed of a flexible sheet material such as a plastic or metal, and preferably a plastic material. Any plastic or metal sheet material can be used provided it has sufficient flexibility to be folded over as indicated in FIGS. 10-13, and has sufficient tensile strength to support the desired banner, sign, etc., as indicated in FIGS. 10-12. Examples of the metals that can be used include thin flexible sheets of steel or aluminum. Examples of the plastics that can be used include polyethylene, polypropylene, nylon, polyester, polyvinyl chloride, and the like.

The adhesive 142, 146, 152 and 156 (FIG. 8) and 162 (FIG. 8A) is preferably a pressure-sensitive adhesive. An example of such an adhesive is MT2 Adhesive (a product of Morgan Adhesives identified as a rubber-based adhesive). A useful adhesive is acrylic glue.

The protective release sheet 148 and 158 (FIG. 8) and 164 FIG. 8A) can be paper or a thin plastic material. Examples of the paper include paper treated with a coating (e.g., a polymeric coating) to provide a smooth, non-absorbent finish. Examples of the plastic material include polyethylene, polypropylene, and the like.

The foam layer 144 is preferably made of a foamed plastic material. Examples include polyethylene, polypropylene, polyurethane, polyvinylchloride, and the like.

In one embodiment (see, FIG. 8), the composite consisting of adhesive layer 142 (or 152), foam layer 144 (or 154), adhesive layer 146 (or 155) and protective release sheet 148 (or 158) is provided in the form of a composite tape and is adhered to strip 140 by securing adhesive layer 142 (or 152) to strip 140. Examples of such composite tapes include IM 1700 and IM 1720 (both of which are composite tape products provided by Morgan Adhesives).

Figure 9:
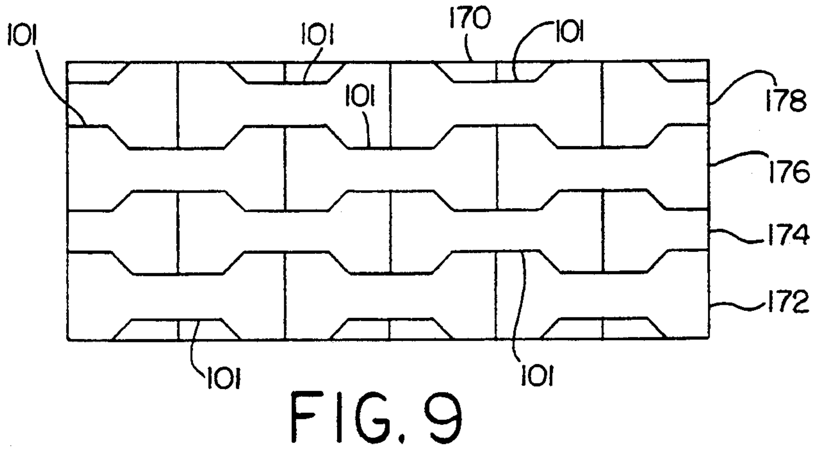
FIG. 9 is a topical view of a laminate structure showing a die pattern for making the comer tab depicted in FIG. 6A.

Referring now to FIG. 9, the inventive method for making the inventive comer tab 101 (FIGS. 6A and 8A) is described. A sheet of a thin flexible material 170 is provided for making the elongated flexible strips 140 of the inventive corner tabs 101. An adhesive layer which corresponds to the adhesive layer 162 in the comer tab 101 is applied to at least one side of the flexible sheet 170. A protective release sheet which corresponds to release sheet 164 is then placed over the adhesive. The resulting laminate structure is then cut with a die following the pattern illustrated in FIG. 9. In this pattern, the inventive corner tabs 101 are aligned end to end in a plurality of successive courses 172, 174, 176 and 178, one above the other. Each of these successive courses are off center from the next adjacent successive course by one-half the length of corner tab 101. As a result, each successive course is immediately adjacent the next successive course, with no waste of material in between the successive courses.

The method of manufacturing described above is a substantial improvement over conventional methods in the art for several reasons. The adhesive is attached to the entire sheet of flexible material prior to cutting. No slitting into strips of tape is required. Since tape slitting is not required, tedious tape alignment over the flaps of the comer tabs is unnecessary. Furthermore, since tape slitting is not required, time consuming inspection of tape alignment is also unnecessary. Because of the symmetrical and angular shape of the inventive comer tabs, the corner tabs interlock when laid out on a fiat surface. Therefore, .when produced by the above described method, a better material yield is experienced thus decreasing the waste of the flexible sheet materials, protective release sheet materials and adhesives.

The inventive comer tabs are useful for suspending articles such as signs, banners and the like from ropes, strings, wires, chain link fences, and the like. In one embodiment, the inventive comer tabs are used to suspend a banner from a chain link fence. The protective release sheet overlying the adhesive is removed. One of the two wide end portions is placed through an opening in the chain link fence so that the narrow middle neck portion is adjacent to a fence link. The adhesive based sides of the two wide end portions are then attached to the banner causing the narrow middle neck portion to wrap around the fence link. The neck portion with an adhesive attached thereto creates a "snap lock." The snap lock greatly reduces outward pressure on the neck portion improving the connection between the fence and the inventive corner tab. This results in improved durability and performance with respect to suspending the banner.

Referring now to FIGS. 10–13, the inventive comer tab 100 (or 101) is depicted in various manners for hanging a banner or sign 180 from a rope or string 182. To hang banner or sign 180 from rope or string 182, protective release sheets 148 and 158 of comer tab 100 (or protective release sheet 164 of comer tab 101) are peeled off adhesive layers 146 and 156, respectively, (or adhesive layer 162). Comer tab 100 (or 101) is then folded over rope or string 182 and ends 104 and 106 are adhered to opposite sides of banner or sign 180 by adhesive layers 146 and 156. Neck portion 102 fits around and attaches to rope or string 182. In FIG. 10, the comer tab is vertically oriented relative to the banner or sign 180, and the edge of the comer tab overlies and is even with the edge of the banner or sign 180. In FIG. 11, the comer tab is attached to the comer of banner or sign 180 at a 45° angle, and the edges of the comer tab overlie and are even with the comer edges of banner or sign 180. In FIG. 12, the comer tab is attached to an intermediate portion of the banner or sign 180 and is vertically oriented relative to the banner or sign.

Figure 13:
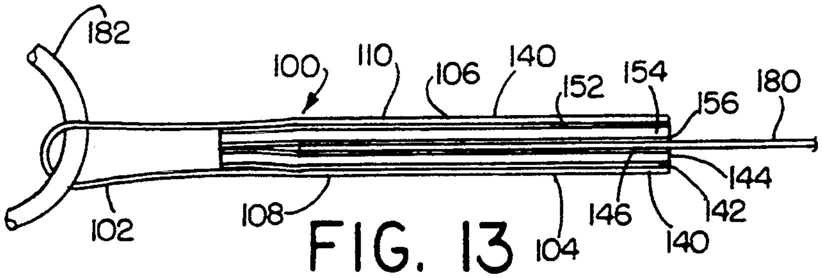
FIG. 13 is a side elevational view of the comer tab depicted in FIG. 6 suspending an article from a string or rope.

Referring to FIG. 13, the grip provided by the comer tab 100 is illustrated. Because of the elongated neck portion 102 and the fact that adhesive is applied to part of the neck portion 102 as well as the end portions 104 and 106 and intermediate tapered portions 108 and 110, the contact area for adhesion provides a strong bond or "snap lock" between the banner or sign 180, rope or string 182, and the comer tab 100.

While the invention has been explained in relation to its preferred embodiments, it is to be understood that various modifications thereof will become apparent to those skilled in the art upon reading this specification. Therefore, it is to be understood that the invention disclosed herein is intended to cover modifications as they fall within the scope of the appended claims.

I claim:

1. A corner tab for hanging or suspending an article, comprising:
   - an elongated flexible strip having sufficient tensile strength article;
   - with a pressure sensitive adhesive laminate; and
   - a protective release sheet overlying said adhesive laminate;
   - said corner tab provided with straight lines and sharp corners and having a narrow middle neck portion and opposed wide end portions, said end portions being aligned along the center axis of said middle neck portion and being connected to said middle neck portion by tapered intermediate portions, each of said tapered intermediate portions having narrow ends adjacent said narrow middle neck portion and wide ends adjacent said wide end portions, the angles formed at the intersections of each of said intermediate portions with said narrow middle neck portion being about 135°, the angles formed at the intersections of each of said intermediate portions with said wide end portions being about 135°, the width of each of said end portions being about twice the width of said middle neck portion, the length of said middle neck portion being about equal to the combined lengths of said end portions; said adhesive laminate and said protective release sheet overlying each of said end portions, said intermediate tapered portions and part of said neck portion;
   - said adhesive laminate comprising a first pressure sensitive adhesive layer overlying and adhered to said flexible strip, a plastic foam layer overlying and adhered to said first adhesive layer, and a second pressure sensitive adhesive layer overlying and adhered to said plastic foam layer, said protective release sheet overlying and adhered to said second adhesive layer.

2. The comer tab of claim 1 wherein said flexible strip is made of a flexible plastic material.

3. The comer tab of claim 1 wherein said protective release sheet is made of paper.

4. The comer tab of claim 1 with a centrally located hole in each of said end portions.

* * * * *